(12) United States Patent
Chen et al.

(10) Patent No.: US 9,694,445 B2
(45) Date of Patent: Jul. 4, 2017

(54) POLE SHEET LASER CUTTING MACHINE

(75) Inventors: Qiang Chen, Guangdong (CN); Guogen Xu, Shenzhen (CN)

(73) Assignee: Geesun Automation Technology Co., Ltd., Guangdong (CN)

( * ) Notice: Subject to any disclaimer, the term of this patent is extended or adjusted under 35 U.S.C. 154(b) by 771 days.

(21) Appl. No.: 14/000,398

(22) PCT Filed: Oct. 28, 2011

(86) PCT No.: PCT/CN2011/081514
§ 371 (c)(1),
(2), (4) Date: Sep. 27, 2013

(87) PCT Pub. No.: WO2012/109918
PCT Pub. Date: Aug. 23, 2012

(65) Prior Publication Data
US 2014/0014633 A1    Jan. 16, 2014

(30) Foreign Application Priority Data
Feb. 18, 2011   (CN) .......................... 2011 1 0040779

(51) Int. Cl.
*B23K 26/38* (2014.01)
*B23K 26/08* (2014.01)
(Continued)

(52) U.S. Cl.
CPC .......... *B23K 26/38* (2013.01); *B23K 26/0846* (2013.01); *B23K 26/0876* (2013.01); *B23K 26/40* (2013.01); *B23K 37/00* (2013.01); *B23K 37/0235* (2013.01); *H01M 4/04* (2013.01); *B23K 2201/16* (2013.01); *B23K 2201/40* (2013.01); *B23K 2203/50* (2015.10); *H01M 10/049* (2013.01); *H01M 10/052* (2013.01); *H01M 10/058* (2013.01); *H01M 10/0525* (2013.01); *Y02E 60/122* (2013.01)

(58) Field of Classification Search
CPC  B23K 26/0846; B23K 26/0876; B23K 26/38; B23K 26/40; B23K 37/0235; B23K 2201/16; B23K 2201/40
See application file for complete search history.

(56) References Cited

U.S. PATENT DOCUMENTS

| | | | | |
|---|---|---|---|---|
| 4,740,668 A | * | 4/1988 | Perez | B23K 10/006 219/121.82 |
| 5,436,423 A | * | 7/1995 | Welty | B26F 1/3813 219/121.67 |

(Continued)

FOREIGN PATENT DOCUMENTS

| | | | |
|---|---|---|---|
| CN | 101722370 A | * | 6/2010 |
| JP | 2001-105170 A | * | 4/2001 |
| WO | WO-2011/076083 A1 | * | 6/2011 |

OTHER PUBLICATIONS

Machine translation of China Patent document No. 101722370, Jun. 2016.*

*Primary Examiner* — Geoffrey S Evans
(74) *Attorney, Agent, or Firm* — Michael A. Bondi; Moss & Barnett

(57) ABSTRACT

Disclosed is a pole sheet laser cutting machine. It comprises a base frame, a laser cutting device, a sheet-cutting robotic arm for driving the laser cutting device, a control system, and at least one sheet feeding assembly.

10 Claims, 5 Drawing Sheets

(51) Int. Cl.

| | |
|---|---|
| *B23K 37/00* | (2006.01) |
| *B23K 37/02* | (2006.01) |
| *H01M 4/04* | (2006.01) |
| *B23K 26/40* | (2014.01) |
| *B23K 101/16* | (2006.01) |
| *B23K 101/40* | (2006.01) |
| *H01M 10/04* | (2006.01) |
| *H01M 10/052* | (2010.01) |
| *H01M 10/058* | (2010.01) |
| *H01M 10/0525* | (2010.01) |
| *B23K 103/00* | (2006.01) |

(56) References Cited

U.S. PATENT DOCUMENTS

| | | | | |
|---|---|---|---|---|
| 2004/0108305 | A1* | 6/2004 | Harnisch | B23K 26/0846 |
| | | | | 219/121.72 |
| 2009/0031870 | A1* | 2/2009 | O'Connor | B23K 26/0846 |
| | | | | 219/121.67 |

* cited by examiner

POLE SHEET LASER CUTTING MACHINE

RELATED APPLICATIONS

This application claims the benefit of PCT application Serial Number PCT/CN2011/081514, filed on Oct. 28, 2011, which claimed the benefit of CN application Serial Number 201110040779.6, filed on Feb. 18, 2011, each of which is hereby incorporated herein by reference in the respective entirety of each.

FIELD OF THE INVENTION

The present application relates to the field of batteries, and in particular, to a pole sheet laser cutting machine.

RELATED ART

In the production of lithium-ion batteries and super capacitors, the manufacturing process of the pole sheet is very critical. During the current process of manufacturing of the pole sheet, devices such as die cutting machines, gold die cutting machines, and rotary cutting machines are generally used to cut the pole sheet; however, since the pole sheet is made of thin aluminum foils and copper foils, it is easily wrinkled or deformed during the processing by the cutting devices so that the flatness of the cut pole sheet does not meet the requirements and the pole sheet has to be scrapped. Moreover, since both sides of the pole sheet have a coating layer, the processing through the cutting device results the pole sheet having large burrs and being easily powdered out, which causes the manufacturing process to have a low qualification rate and to produce many unqualified products. As a result, the problems of low manufacturing efficiency and materials waste persist, and seriously affect the large-scale production of the lithium-ion batteries and super capacitors.

Therefore, there is an urgent need to improve the existing pole sheet manufacturing devices.

SUMMARY OF THE INVENTION

Technical Problem

A main technical problem to be solved by the embodiments of the present invention is to provide a pole sheet laser cutting machine that prevents the pole sheet from being wrinkled or deformed in the manufacturing process and improves the processing quality.

Technical Solution

To solve the above technical problem, the embodiments of the present invention provide a pole sheet laser cutting machine, including a base frame, a laser cutter, a sheet-cutting robotic arm for driving the laser cutter, a control system, and at least one sheet feeding assembly; the sheet feeding assembly includes a sheet-clamping robotic arm, a fixed-length feeding component and a discharging component, the sheet-cutting robotic arm and the sheet-clamping robotic arm are installed on the base frame, the fixed-length feeding component is disposed between the sheet-clamping robotic arm and the discharging component, the control system is connected to the sheet-cutting robotic arm, the sheet-clamping robotic arm and the fixed-length feeding component.

Further, the sheet-clamping robotic arm includes a push rod and a front clamping device for clamping the front portion of the pole sheet, the fixed-length feeding component includes a middle clamping device for clamping the middle portion of the pole sheet and a sheet feeder for driving the middle clamping device to move back and forth, the front clamping device is installed at a front end of the push rod, and the middle clamping device is installed at a back end of the push rod.

A negative pressure source is further included, where the sheet-clamping robotic arm further includes a suction device, the suction device including a suction head and an adsorption board with suction holes, the suction head being disposed below the adsorption board and connecting to the negative pressure source; the front clamping device includes two groups of collets respectively disposed at two sides of the adsorption board, and a control cylinder driving the collets.

Preferably, the sheet feeder includes a servo drive device and a position detecting device; where the servo drive device includes a servo motor driving the middle clamping device to move back and forth and a fixed-length feeding base plate, the middle clamping device is located above the fixed-length feeding base plate, the position detecting device includes multiple photoelectric sensors disposed on the top of the fixed-length feeding base plate, and a reflector panel disposed at the bottom of the middle clamping device; the photoelectric sensors and the servo drive device are connected to the control system.

Preferably, the fixed-length feeding component further includes a fixed-length feeding rectification device, the fixed-length feeding rectification device being installed at a back end of the push rod and following up the middle clamping device.

Preferably, the discharging component further includes a discharging rectification device.

Preferably, the sheet feeding assembly further includes a sheet-reclaiming robotic arm and a feeding box component, where the sheet-reclaiming robotic arm has a suction side, the sheet-reclaiming robotic arm and the feeding box component are installed on the base frame, and the sheet-reclaiming robotic arm is connected to the control system.

The feeding box component includes a box, a movable board for supporting the cut pole sheet, an ejection part for driving the movable board, and a material sensor, where the movable board is located at the bottom of the box, the material sensor is disposed at an opening portion of the box, and the ejection part and the material sensor are connected to the control system.

Further, the suction side is further provided with a distribution cylinder.

In an embodiment, there are two sheet feeding assemblies, where the two sheet feeding assemblies are correspondingly disposed at two sides of the base frame to form a double-station pole sheet laser cutting machine.

Beneficial Effect

The embodiments of the present invention have the following beneficial effects: the embodiments of the present invention use laser technologies to manufacture lithium-ion batteries or super capacitors, and make full use of the excellent characteristics of the laser, such as good monochromaticity, small divergence angle, and being capable of focusing into a high-power spot at the focal point of the lens. A dedicated laser head and control software, and a fully automatic robotic arm are used to cut the pole sheet, which overcomes the problems in the prior art that the pole sheet is easily deformed and has larger burrs caused by the traditional cutting process, improves the quality of the manufacturing process, and ensures the product quality of the lithium-ion batteries and super capacitors. Under the control of the control system, the dimension error of the pole sheet is reduced, and the pole sheet has characteristics of high accuracy, fast speed, small burrs and being less powered out, thereby improving the yield.

Further, the embodiments of the present invention use the control system to achieve fully automatic control over the discharging, sheet feeding, cutting, reclaiming and rectification during the discharging and sheet feeding, which not only increases the manufacturing efficiency but also improves the machining precision and reduces the rejection rate.

The embodiments of the present invention further provide a double-station laser cutting machine, so that the laser cutter cuts a double-station pole sheet by turns, which significantly increases the manufacturing efficiency.

DETAILED DESCRIPTION OF THE EMBODIMENTS

The embodiments of the present invention are further described below in detail with reference to specific embodiments and accompanying drawings.

Figure 1:
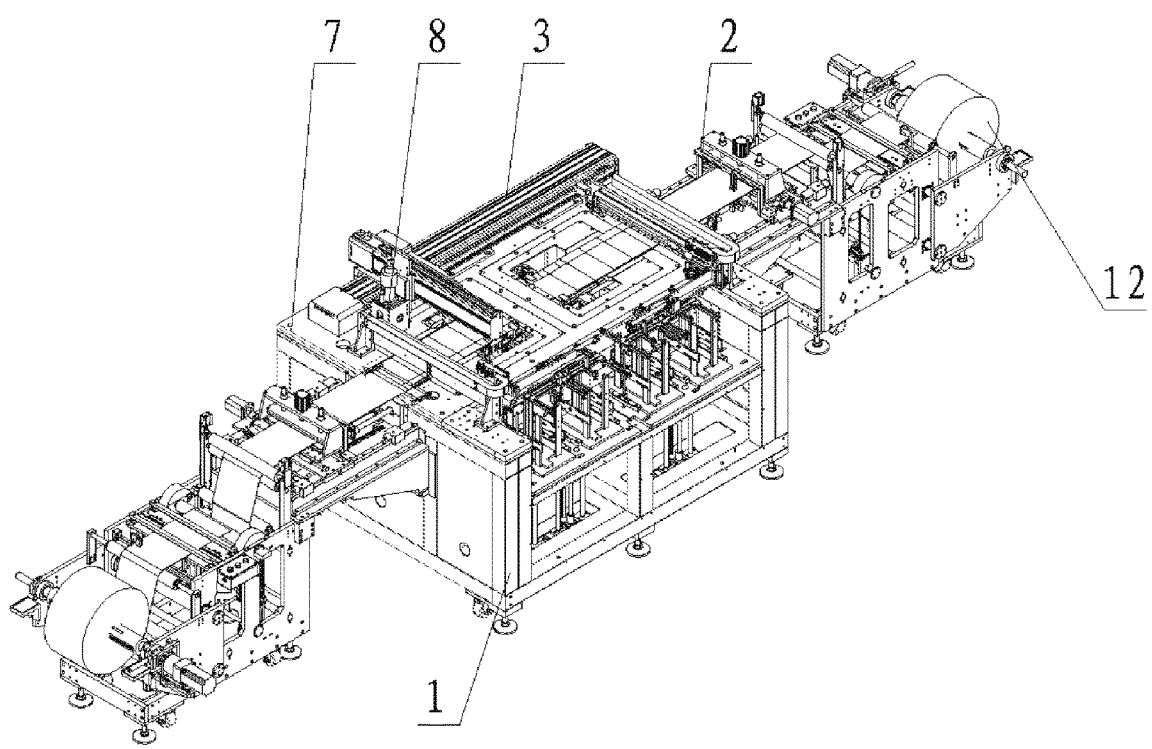
FIG. 1 is a perspective view of a pole sheet laser cutting machine according to an embodiment of the present invention.
Figure 2:
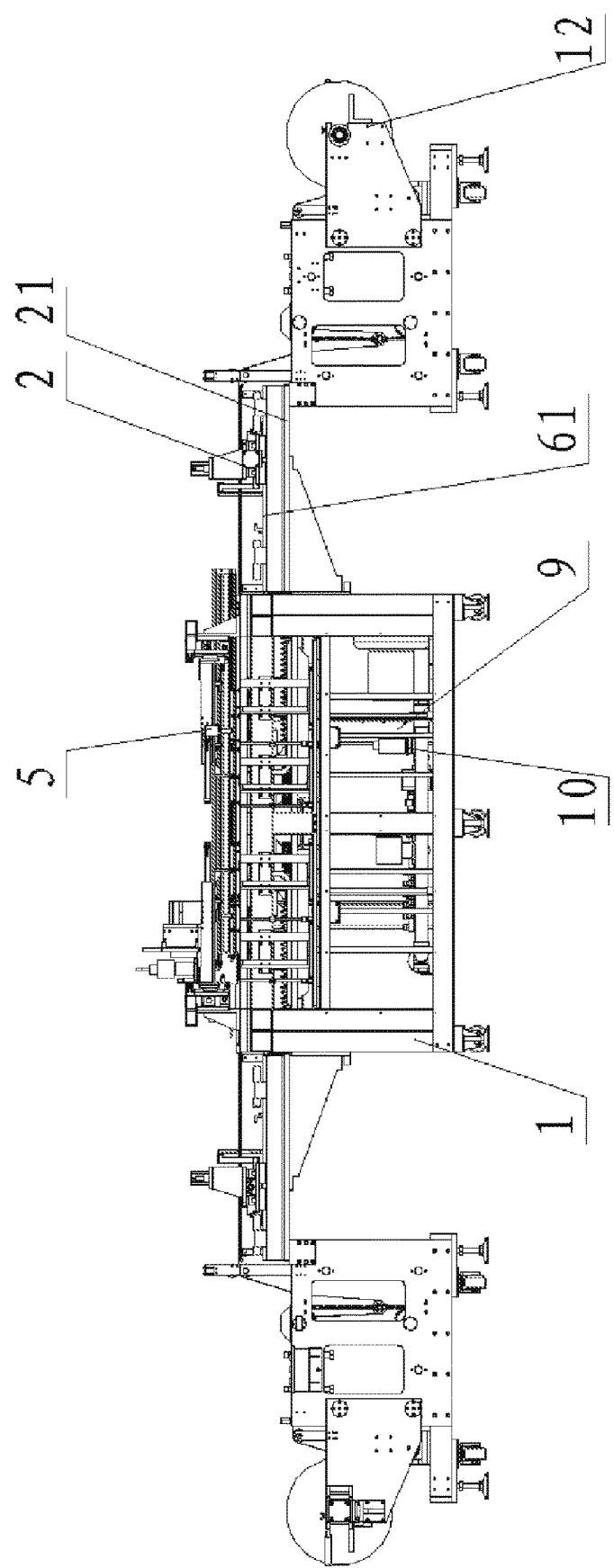
FIG. 2 is a front view of the pole sheet laser cutting machine in FIG. 1.
Figure 3:
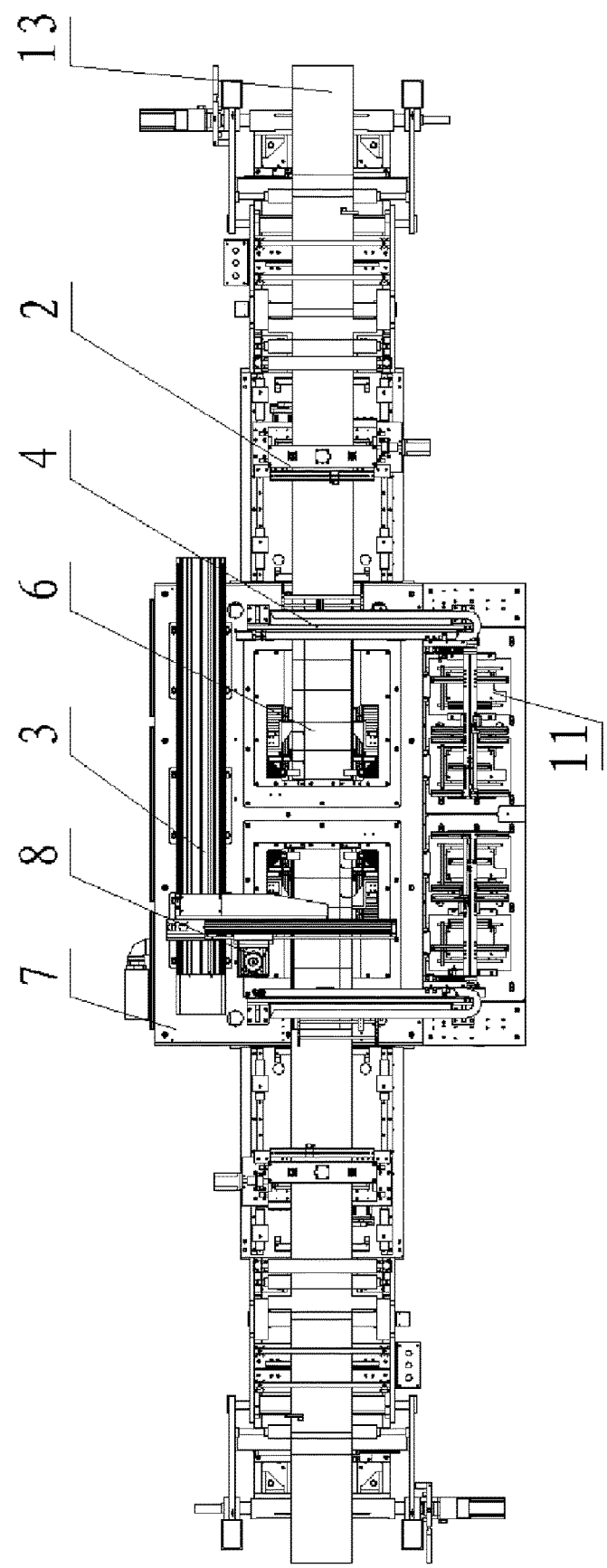
FIG. 3 is a top view of the pole sheet laser cutting machine in FIG. 1.

Referring to FIG. 1 to FIG. 3, the pole sheet laser cutting machine in this embodiment includes a base frame 1, a laser cutter 8, a sheet-cutting robotic arm 3 for driving the laser cutter 8 to move so as to cut a pole sheet 13, a control system, and at least one sheet feeding assembly. The sheet feeding assembly is used to move the pole sheet 13 to be cut to a cutting platform 7 above the base frame 1 so as to be cut into certain sizes and shapes. According to specific needs of this embodiment, a single-station laser cutter includes one sheet feeding assembly, a double-station laser cutting machine or a multi-station laser cutting machine may include two or more sheet feeding assemblies, and each station may achieve single-width cutting or double-width cutting. The sheet feeding assembly specifically includes a sheet-clamping robotic arm 6, a fixed-length feeding component 2 and a discharging component 12, the sheet-cutting robotic arm 3 and the sheet-clamping robotic arm 6 are installed on the base frame 1, the fixed-length feeding component 2 is disposed between the sheet-clamping robotic arm 6 and the discharging component 12. The discharging component 12 includes a discharging roller, which first fixes a coil onto an inflatable shaft of the discharging roller during discharging, and during the fully automatic pole sheet cutting, the pole sheet 13, under the action of the servo motor, is transported to the fixed-length feeding component 2 through multiple guide rollers and a tension caching device;

the sheet-clamping robotic arm 6 grips the head of the pole sheet 13, and the fixed-length feeding component 2 grips the middle portion of the pole sheet and uses the servo driving device for stroke control, so as to ensure that the pole sheet 13 having a certain length is moved to the cutting platform 7 each time. The control system is connected to the sheet-cutting robotic arm 3, the sheet-clamping robotic arm 6, the fixed-length feeding component 2, the discharging component 12 and other components, for correspondingly controlling respective components according to the process.

The embodiments of the present invention use laser technologies to manufacture lithium-ion batteries or super capacitors, and make full use of the excellent characteristics of the laser, such as good monochromaticity, small divergence angle, and being capable of being focused into a high-power spot at the focal point of the lens. A dedicated laser head and control software, and a fully automatic robotic arm are used to cut the pole sheet 13, which overcomes the problems in the prior art that the pole sheet 13 is easily deformed and has larger burrs caused by the traditional cutting process, thereby improving uniformity of electrical cores made by the pole sheet 13, and ensuring the product quality of the lithium-ion batteries and super capacitors. Under the control of the control system, the fixed-length feeding component 2 and the sheet-clamping robotic arm 6 are coordinated to transport the pole sheet having a certain length to the cutting platform 7 each time, so that the dimensional error of the pole sheet is reduced, and the pole sheet has the characteristics of high accuracy, fast speed, small burrs and being powered out less, thereby improving the yield.

In this embodiment, the sheet-clamping robotic arm 6 includes a push rod 61 and a front clamping device for clamping a front portion of the pole sheet 13, the fixed-length feeding component 2 includes a middle clamping device for clamping a middle portion of the pole sheet 13 and a sheet feeder for driving the middle clamping device to move back and forth. The front clamping device is installed at a front end of the push rod 61, and the middle clamping device is installed at a back end of the push rod 61. During the sheet feeding, the sheet feeder drives the middle clamping device to move forward a certain distance, so that the push rod 61 drives the front clamping device to move forward a certain distance to complete one-time feeding; upon completion of the feeding, the sheet-cutting robotic arm 3 drives the laser cutter 8 to cut paths according to a preset pattern, to cut the pole sheet 13 on the cutting platform 7, and after the cutting ends, the sheet feeder re-drives the middle clamping device, the push rod 61 and the front clamping device to reset so as to facilitate next feeding.

To facilitate the cutting, the pole sheet laser cutting machine in this embodiment further includes a negative pressure source for adsorbing the pole sheet 13 to avoid movement of the pole sheet 13, and the sheet-clamping robotic arm 6 further includes a substrate and a suction device. The substrate is installed at the top of the base frame 1, mainly used to form support for the push rod 61, the front clamping device and the suction device, the suction device includes a suction head and an adsorption board fixed above the substrate, and the adsorption board has multiple suction holes which are capable of adsorbing the pole sheet 13 transported by the front clamping device. Multiple suction heads at the bottom of the adsorption board provide adsorption force for the adsorption board, and the suction heads are quick connectors which connect the negative pressure source. Preferably, the negative pressure source is a fan component 10 disposed at the bottom of the base frame 1, capable of adsorbing the thinner pole sheet 13 under the action of strong wind to avoid position offset of the pole sheet 13.

The front clamping device is fixed at a front end of the push rod 61 through a connection plate and a connection bracket; in an embodiment, the front clamping device mainly includes a control cylinder and two groups of collets respectively disposed at two sides of the adsorption board. The control cylinder includes a rising control cylinder and a back-off control cylinder, each group of collets include grippers and upper clamps and lower clamps driven by the grippers, the grippers are connected to a pusher of the rising control cylinder, the rising control cylinder is connected to a pusher of the back-off control cylinder, and the back-off control cylinder and the substrate form a shifting pair. The rising control cylinder and the back-off control cylinder are preferably slide cylinders with guide rails, the rising control cylinder is connected to the back-off control cylinder through a fixed plate and a cylinder mount, and the back-off control cylinder is connected to a linear sliding pair on the base frame through a cylinder block. The grippers may be parallel open-closed grippers, and connect the pusher of the rising control cylinder through a gripper mounting plate. When clamping the pole sheet 13, two pairs of upper clamps and lower clamps respectively grip the front portion of the pole sheet 13 under the driving of the grippers, the grippers rise under the action of upward driving of the rising control cylinder to lift the head of the pole sheet 13, after the push rod moves forward to complete transport of the pole sheet 13, the rising control cylinder drives the collets to fall and reset, the collets loosen the head of the pole sheet 13, and finally, the back-off control cylinder drives the rising control cylinder to retreat toward two sides away from the pole sheet 13.

Upon completion of cutting of the pole sheet 13, a waste discharging device may also be used to automatically discharge remaining wastes, so as to increase the manufacturing efficiency; the waste discharging device can have various forms; for example, it can be a waste tray rack with a sucker, which adsorbs wastes under the driving of the cylinder and then throws off the wastes, or adsorbs wastes and then overturns the waste tray rack to make the wastes automatically fall.

The sheet feeder in the fixed-length feeding component 2 includes a servo drive device and a position detecting device for controlling stroke of the servo drive device. Specifically, the servo drive device includes a fixed-length feeding base plate 21, a guide rail mounting plate and a servo motor driving the middle clamping device to move back and forth, where the guide rail mounting plate is fixed above the fixed-length feeding base plate 21, and its upper surface is provided with a guide rail forming a guide rail pair with the middle clamping device, to make the middle clamping device locate above the fixed-length feeding base plate 21. The serve motor is fixed onto the fixed-length feeding base plate, for driving the middle clamping device to grip the pole sheet 13 to move back and forth within a certain stroke range along the guide rail, and stroke and position of the specific back-and-forth movement are controlled by the control system. The position detecting device is used for detecting and ensuring that the sheet feeder maintains fixed-length feeding in front and back directions, which includes multiple photoelectric sensors disposed on the top of the fixed-length feeding base plate, and a reflector panel disposed at the bottom of the middle clamping device, where the photoelectric sensors could interact with the reflector panel so as to detect the movement position of the middle clamping device, to facilitate the control system to control the feeding length of the pole sheet. For example, there are three photoelectric sensors respectively disposed at a front end, a middle portion and a back end of the fixed-length feeding base plate 21, all installed on the fixed-length feeding base plate 21 through a sensor mounting rail to facilitate movement, the photoelectric sensors 21 at the front and back ends are used for detecting front and back limit positions of the reflector panel, the photoelectric sensor at the middle portion is used for detecting system zeroing, and the photoelectric sensors may input detection results into the control system so as to accurately control the movement stroke of the servo motor.

In order to avoid position offset of the pole sheet 13 in left and right directions during the feeding, the fixed-length feeding component 2 further includes a fixed-length feeding rectification device, the fixed-length feeding rectification device being installed at a back end of the push rod 61 and following up the middle clamping device. In an embodiment, the fixed-length feeding rectification device includes a feeding slide plate, a rectification supporting plate, an edge-searching opposite-type sensor, and a rectification driving device driving the rectification supporting plate to move left and right; the feeding slide plate is fixed at a back end of the push rod 61, the rectification supporting plate is movably installed above the feeding slide plate, the middle clamping device is fixed onto the rectification supporting plate, the edge-searching opposite-type sensor is disposed at a side of the feeding slide plate, and the rectification driving device and the edge-searching opposite-type sensor are connected to the control system. The edge-searching opposite-type sensor includes a transmitter and a receiver located above and below the pole sheet, capable of detecting edges of the pole sheet 13 and outputting signals to the control system, so that the control system could control the rectification driving device to accurately control the position of the rectification supporting plate. The rectification driving device may be a servo motor which is fixed on the feeding slide plate and can drive the rectification supporting plate to slide left and right through a coupling and a ball screw pair so as to achieve left and right rectification of the pole sheet 13.

The middle clamping device is wholly installed on the rectification supporting plate, and can use an upper rubberized plate and a lower rubberized plate to clamp the middle portion of the pole sheet under the driving of a clamping cylinder; preferably, a silica gel is affixed to surfaces of the two rubberized plates to ensure that the pole sheet is not damaged when being gripped.

Preferably, in order to avoid position offset of the pole sheet 13 in left and right directions during the feeding, the discharging component 12 may further include a discharging rectification device, and the discharging rectification device has a structure similar to that of the fixed-length feeding rectification device, which mainly detects edges of the pole sheet 13 through the edge-searching opposite-type sensor and ensure feeding precision through the rectification driving device under the action of the control system, to achieve first automatic rectification before the sheet feeding.

Further, the sheet feeding assembly in this embodiment also achieves automatic feeding upon completion of cutting of the pole sheet 13, and specifically, the sheet feeding assembly further includes a sheet-reclaiming robotic arm 4 and a feeding box component 11, where the sheet-reclaiming robotic arm 4 has a suction side 5, the suction side 5 provides adsorption force through the negative pressure source and can adsorb the pole sheet whose cutting is completed under the driving of the sheet-reclaiming robotic arm 4 and moves the pole sheet to the feeding box component 11, if it is a double-width cutting, a distribution cylinder of the suction side 5 may be used to distribute the pole sheet 13 and then place the pole sheet into the feeding box component 11. The sheet-reclaiming robotic arm 4 and the feeding box component 11 are installed on the base frame 1, and the sheet-reclaiming robotic arm 4 is connected to the control system to accept its control. Preferably, the feeding box component includes a box, a movable board for supporting the cut pole sheet 13, an ejection part for driving the movable board to move up and down, and a material sensor, where the movable board is located at the bottom of the box, the material sensor may be a photoelectric sensor and is disposed at an opening portion of the box, and the ejection part and the material sensor are connected to the control system. The ejection part may be a lifting motor connected to the control system, and each time the suction side places one sheet of the cut pole sheet 13 into the box, the lifting motor drives the movable board to drop a constant height, so that the feeding box component 11 of the pole sheet could automatically load. After detecting that the feeding box component 11 is full, the material sensor immediately outputs a signal to the control system, to prompt the operator to change the feeding box component 11.

As shown in FIG. 1, the pole sheet laser cutting machine in this embodiment has two sheet feeding assemblies, where the two sheet feeding assemblies are correspondingly disposed at two sides of the base frame 1 to form a double-station pole sheet laser cutting machine having a left station and a right station, a left/right discharging component feeds materials to a double-station cutting platform from two ends through a left/right fixed-length feeding component, and the laser cutter 8 may, under the control of the control system, perform high-speed cutting on the pole sheet 13 gripped by a left/right sheet-clamping robotic arm 6, so that the utilization rate of the laser cutter 8 is doubled, thereby further increasing the manufacturing efficiency on the basis of achieving the fully automatic laser cutting.

Figure 4:
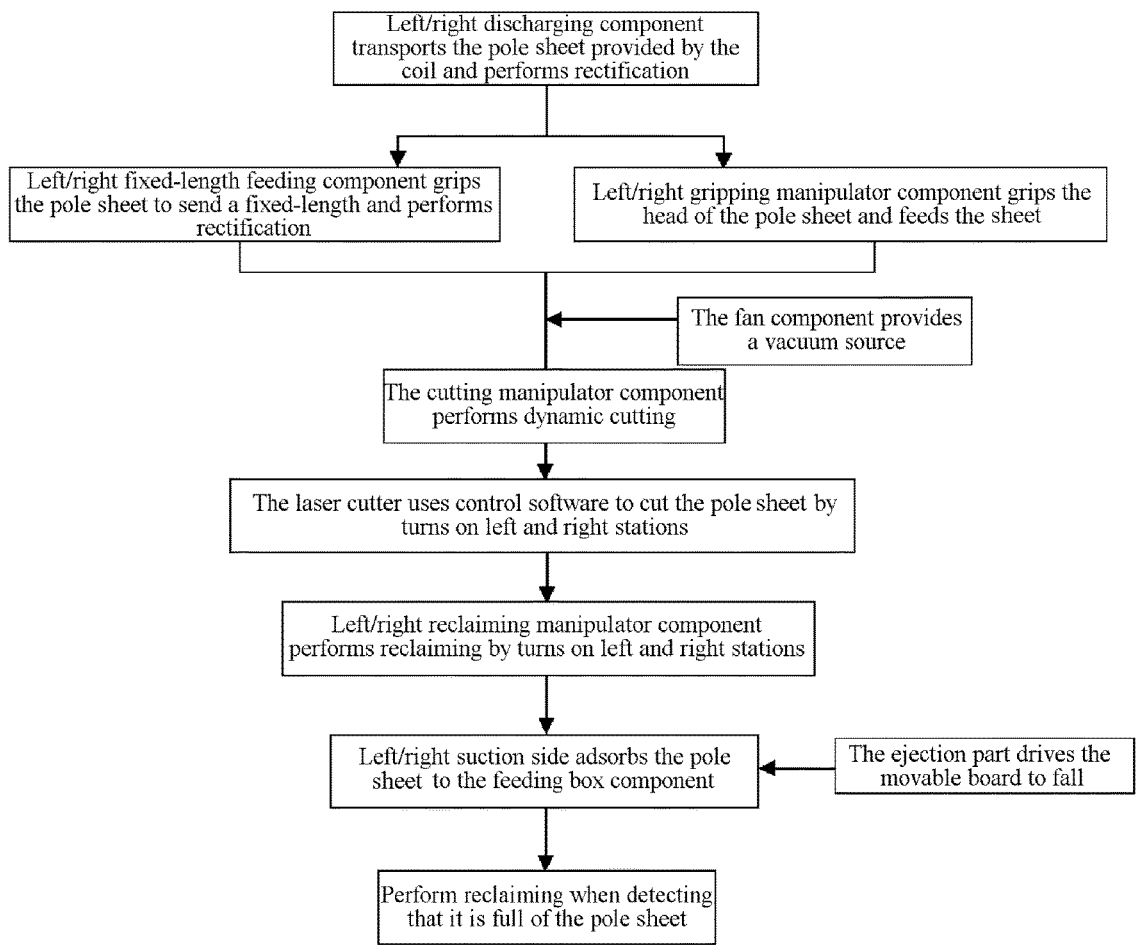
FIG. 4 is a flow chart of cutting of the pole sheet laser cutting machine in FIG. 1.

As shown in FIG. 4, the cutting flow of the double-station pole sheet laser cutting machine is as follows.

Step 1: a left/right discharging component transports the pole sheet provided by the coil, and uses the discharging rectification device to perform left and right rectification;

Step 2: the fixed-length feeding component grips the middle portion of the pole sheet to send a fixed-length, left and right rectification is performed by using the fixed-length feeding rectification device, and meanwhile, a left/right sheet-clamping robotic arm uses a collet to grip the head of the pole sheet for feeding;

Step 3: start the fan component to provide a vacuum source, and fix a pole sheet to be cut onto the adsorption board;

Step 4: the sheet-cutting robotic arm drives the laser cutter to move, and prepares to dynamically cut the pole sheet;

Step 5: the laser cutter uses control software to cut the pole sheet by turns on left and right stations;

Step 6: upon completion of double-station cutting, a left/right sheet-reclaiming robotic arm drives a left/right suction side to begin left-and-right-station reclaiming by turns;

Step 7: the left/right suction side adsorbs the pole sheet whose cutting is completed to a corresponding left/right feeding box component, and in the process, the ejection part drives the movable board at the bottom of the box to drop a certain height so as to accommodate more pole sheets; and Step 8: when detecting that the left/right feeding box component is full of pole sheets, the material sensor sends information to the control system to prompt the operator.

Figure 5:
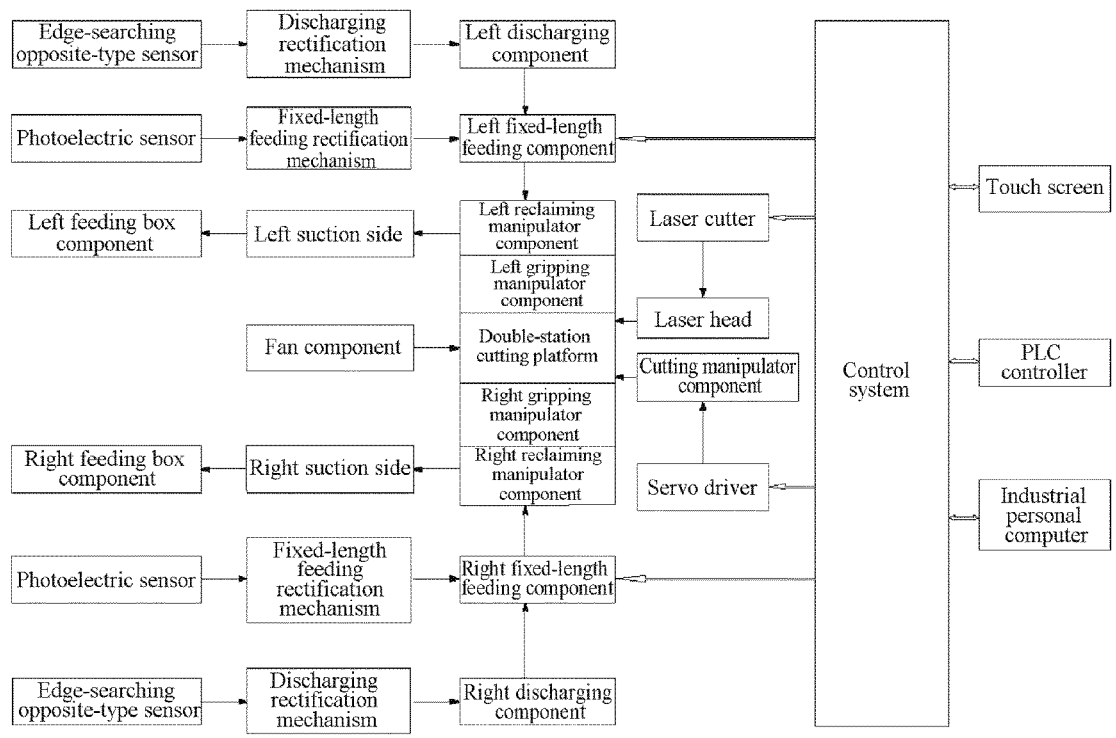
FIG. 5 is a control schematic view of the pole sheet laser cutting machine in FIG. 1.

As shown in FIG. 5, the control system of the double-station pole sheet laser cutting machine according to an embodiment of the present invention generally is a single chip microcomputer or a PLC (programmable logic controller) or other devices, which may interact with the operator through a touch screen, a keyboard, a PLC controller, or an industrial personal computer. The control system is preset with a program for controlling the manufacturing process, and during the discharging, the control system can use an edge-searching opposite-type sensor to detect the edges of the pole sheet, so as to perform first left and right rectification on the pole sheet in the left/right discharging component through the discharging rectification device; during the feeding, the control system drives the fixed-length feeding component through servo driving device to transport the pole sheet to the double-station cutting platform, and uses the edge-searching opposite-type sensor to re-detect the edges of the pole sheet, so as to perform second left and right rectification on the pole sheet through the fixed-length feeding rectification device; during the cutting, the left/right sheet-reclaiming robotic arm uses the adsorption board connecting the fan component to fix the pole sheet, the control system uses a servo driver to control the sheet-cutting robotic arm, to make it drive a laser controller to move on the double-station cutting platform, and the control system further provides cutting electronic documents to the laser controller, so as to make the laser head to cut the pole sheet according to a preset cutting path; upon completion of the cutting, the left/right sheet-reclaiming robotic arm uses the left/right suction side to adsorb the cut pole sheet to the corresponding left/right feeding box component.

The present invention is described above in details in combination with specific embodiments, but the scope of the present invention is not limited to the specific embodiments. Persons of ordinary skill in the art also can made simple deductions or replacements without departing from the concept of the present invention, which are within the scope of the present invention.

What is claimed is:

1. A pole sheet laser cutting machine, comprising a base frame, a laser cutter, a sheet-cutting robotic arm for driving the laser cutter, and at least one sheet feeding assembly; wherein the sheet feeding assembly comprises a sheet-clamping robotic arm, a fixed-length feeding component and a discharging component, the sheet-cutting robotic arm and the sheet-clamping robotic arm are installed on the base frame, the fixed-length feeding component is disposed between the sheet-clamping robotic arm and the discharging component, a control system is connected to the sheet-cutting robotic arm, the sheet-clamping robotic arm and the fixed-length feeding component.

2. The pole sheet laser cutting machine of claim 1, wherein the sheet-clamping robotic arm comprises a push rod and a front clamping device configured to clamp a front portion of a pole sheet, the fixed-length feeding component comprises a middle clamping device configured to clamp a middle portion of the pole sheet and a sheet feeder configured to drive the middle clamping device to move back and forth, the front clamping device is installed at a front end of the push rod, and the middle clamping device is installed at a back end of the push rod.

3. The pole sheet laser cutting machine of claim 2, further comprising a negative pressure source, wherein the sheet-clamping robotic arm further comprises a suction device, the suction device comprising a suction head and an adsorption board with suction holes, the suction head being disposed below the adsorption board and connecting the negative pressure source; the front clamping device comprises two groups of collets respectively disposed at two sides of the adsorption board, and a control cylinder driving the collets.

4. The pole sheet laser cutting machine of claim 3, wherein the feeder device comprises a servo drive device and a position detecting device; wherein the servo drive device comprises a servo motor configured to drive the middle clamping device to move back and forth and a fixed-length feeding base plate, the middle clamping device is located above the fixed-length feeding base plate, the position detecting device comprises multiple photoelectric sensors disposed on top of the fixed-length feeding base plate, and a reflector panel disposed at the bottom of the middle clamping device; the photoelectric sensors and the servo drive device are connected to the control system.

5. The pole sheet laser cutting machine of claim 2, characterized in that, the fixed-length feeding component further comprises a fixed-length feeding rectification device, the fixed-length feeding rectification device being installed at a back end of the push rod and following up the middle clamping device.

6. The pole sheet laser cutting machine of claim 1, wherein the discharging component further comprises a discharging rectification device.

7. The pole sheet laser cutting machine of claim 1, wherein the sheet feeding assembly further comprises a sheet-reclaiming robotic arm and a feeding box component, wherein the sheet-reclaiming robotic arm has a suction side, the sheet-reclaiming robotic arm and the feeding box component are installed on the base frame, and the sheet-reclaiming robotic arm is connected to the control system.

8. The pole sheet laser cutting machine of claim 7, wherein the feeding box component comprises a box, a movable board for supporting the cut pole sheet, an ejection part for driving the movable board, and a material sensor, wherein the movable board is located at the bottom of the box, the material sensor is disposed at an opening portion of the box, and the ejection part and the material sensor are connected to the control system.

9. The pole sheet laser cutting machine of claim 7, wherein the suction side further comprises a distribution cylinder.

10. The pole sheet laser cutting machine of claim 1, further comprising two sheet feeding assemblies, wherein the two sheet feeding assemblies are correspondingly disposed at two sides of the base frame.

* * * * *